(12) United States Patent
Polishchuk et al.

(10) Patent No.: US 10,365,818 B2
(45) Date of Patent: Jul. 30, 2019

(54) FORCE TRANSFER ELEMENT FOR EDGE FORCE SENSING

(71) Applicant: Synaptics Incorporated, San Jose, CA (US)

(72) Inventors: Igor Polishchuk, Fremont, CA (US); Shotaro Saito, Cupertino, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 0 days.

(21) Appl. No.: 15/710,710

(22) Filed: Sep. 20, 2017

(65) Prior Publication Data

US 2019/0087062 A1    Mar. 21, 2019

(51) Int. Cl.
*G09G 5/00* (2006.01)
*G06F 3/0488* (2013.01)
*G06F 3/041* (2006.01)

(52) U.S. Cl.
CPC .......... *G06F 3/0488* (2013.01); *G06F 3/0414* (2013.01)

(58) Field of Classification Search
CPC ...... G06F 3/041; G06F 3/0412; G06F 3/0414; G06F 3/0488; G06F 2203/04102; G06F 2203/04105
See application file for complete search history.

(56) References Cited

U.S. PATENT DOCUMENTS

| | | | | |
|---|---|---|---|---|
| 5,942,733 A | * | 8/1999 | Allen | G06K 9/00335 178/18.01 |
| 2002/0163509 A1 | * | 11/2002 | Roberts | G06F 3/0414 345/173 |
| 2008/0029691 A1 | * | 2/2008 | Han | G06F 3/04883 250/224 |
| 2008/0284925 A1 | * | 11/2008 | Han | G06F 3/0425 349/12 |
| 2010/0110018 A1 | * | 5/2010 | Faubert | G06F 1/1626 345/173 |
| 2012/0188202 A1 | * | 7/2012 | Tsujino | G06F 3/0412 345/174 |
| 2012/0293450 A1 | * | 11/2012 | Dietz | G06F 3/0414 345/174 |
| 2014/0253477 A1 | * | 9/2014 | Shim | G06F 3/0487 345/173 |
| 2015/0077364 A1 | * | 3/2015 | Parthasarathy | G06F 3/016 345/173 |
| 2017/0052616 A1 | * | 2/2017 | Lin | G06F 3/044 |
| 2017/0090655 A1 | * | 3/2017 | Zhang | G06F 3/0416 |

(Continued)

*Primary Examiner* — Joe H Cheng
(74) *Attorney, Agent, or Firm* — Paradice and Li LLP

(57) ABSTRACT

An input device includes a deformable input surface and a force sensing layer disposed beneath the deformable input surface. The force sensing layer includes a plurality of force sensors to detect forces exerted by an input object on the deformable input surface. A force transfer layer is disposed between the deformable input surface and the force sensing layer. The force transfer layer is configured to transmit a force exerted by the input object in a first region of the deformable input surface to one of the force sensors coinciding with a first area of the force sensing layer, and to distribute a force exerted by the input object in a second region of the deformable input surface to one or more of the force sensors coinciding with a second area of the force sensing layer, wherein the second area of the force sensing layer is larger than the first area.

19 Claims, 7 Drawing Sheets

(56) References Cited

U.S. PATENT DOCUMENTS

| | | | |
|---|---|---|---|
| 2017/0242506 A1* | 8/2017 | Patel | G06F 3/044 |
| 2017/0262110 A1* | 9/2017 | Polishchuk | G06F 3/041 |
| 2017/0269785 A1* | 9/2017 | Abdollahian | G06F 3/0418 |
| 2018/0032198 A1* | 2/2018 | Suzuki | G02B 6/0046 |
| 2018/0032209 A1* | 2/2018 | Suzuki | G06F 3/0414 |
| 2018/0039367 A1* | 2/2018 | Suzuki | G06F 3/0414 |
| 2018/0081437 A1* | 3/2018 | Taylor | G06F 3/016 |
| 2018/0143669 A1* | 5/2018 | Bok | G06F 3/0412 |
| 2018/0364850 A1* | 12/2018 | Vosgueritchian | G06F 3/0414 |

* cited by examiner

FORCE TRANSFER ELEMENT FOR EDGE FORCE SENSING

TECHNICAL FIELD

The present embodiments relate generally to force sensing, and specifically to enabling force sensing on the edge of a display.

BACKGROUND OF RELATED ART

Input devices including proximity sensor devices (also commonly referred to as touchpads or touch sensor devices) are widely used in a variety of electronic systems. A proximity sensor device typically includes a sensing region, often demarked by an input surface, in which the proximity sensor device determines the presence, location, and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

Some input devices also have the ability to detect forces applied to the input surface in addition to determining positional information for input objects interacting with a sensing region of the input surface. For example, one or more force sensors positioned beneath the input surface may detect the amount of force exerted on the input surface based, at least in part, on a movement or deflection of the input surface under the applied force. Thus, the flexibility of the material used for the input surface (such as a cover screen or lens) may affect the accuracy and/or sensitivity of the force sensors. More specifically, the relative flexibility of the input surface may vary with respect to its surface area. For example, an input surface with a relatively small surface area may be harder to depress or deform (e.g., under external forces) than an input surface having a larger surface area (e.g., assuming both input surfaces are made frame the same material, having the same uniform thickness).

Some modern input devices have curved input surfaces. For example, the cover lens may wrap (or curve) around the sides of a mobile device to detect inputs on the edges of the mobile device and/or display screen. However, the edges of the mobile device may have a significantly smaller surface area than the front surface of the mobile device. Thus, it may be desirable to detect forces exerted in regions of an input surface having different surface areas.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

An apparatus for enabling edge force sensing on an input device is disclosed. The input device includes a deformable input surface and a force sensing layer disposed beneath the deformable input surface. The force sensing layer includes a plurality of force sensors configured to detect forces exerted by an input object on the deformable input surface. A force transfer layer is disposed between the deformable input surface and the force sensing layer. The force transfer layer is configured to transmit a force exerted by the input object in a first region of the deformable input surface to one of the force sensors coinciding with a first area of the force sensing layer. The force transfer layer is further configured to distribute a force exerted by the input object in a second region of the deformable input surface to one or more of the force sensors coinciding with a second area of the force sensing layer, wherein the second area of the force sensing layer is larger than the first area.

In some implementations, the force transfer layer may include a stiffener overlapping the second region of the deformable input surface and the second area of the force sensing layer. The stiffener may be configured to transfer the force exerted in the second region of the deformable input surface to the one or more force sensors in the second area of the force sensing layer. In some aspects, the force transfer layer may be configured to distribute the force exerted in the second region of the deformable input surface to two or more of the force sensors. In some implementations, the stiffener may not overlap the first region of the deformable input surface. In other implementations, the stiffener may at least partially overlap the first region of the deformable input surface, but does not overlap the force sensor in the first area of the force transfer layer.

In some implementations, the deformable input surface may comprise a plastic cover lens. In some aspects, the second region of the deformable input surface is flat and the first region of the deformable input surface is curved. In some other aspects, the second region of the deformable input surface corresponds to a front surface of a display and the first region of the deformable input surface corresponds to an edge of the display. Still further, in some aspects, a thickness of the deformable input surface relative to a surface area of the second region may be greater than the thickness of the deformable input surface relative to a surface area of the first region.

BRIEF DESCRIPTION OF THE DRAWINGS

The present embodiments are illustrated by way of example and are not intended to be limited by the figures of the accompanying drawings.

DETAILED DESCRIPTION

Figure 1:
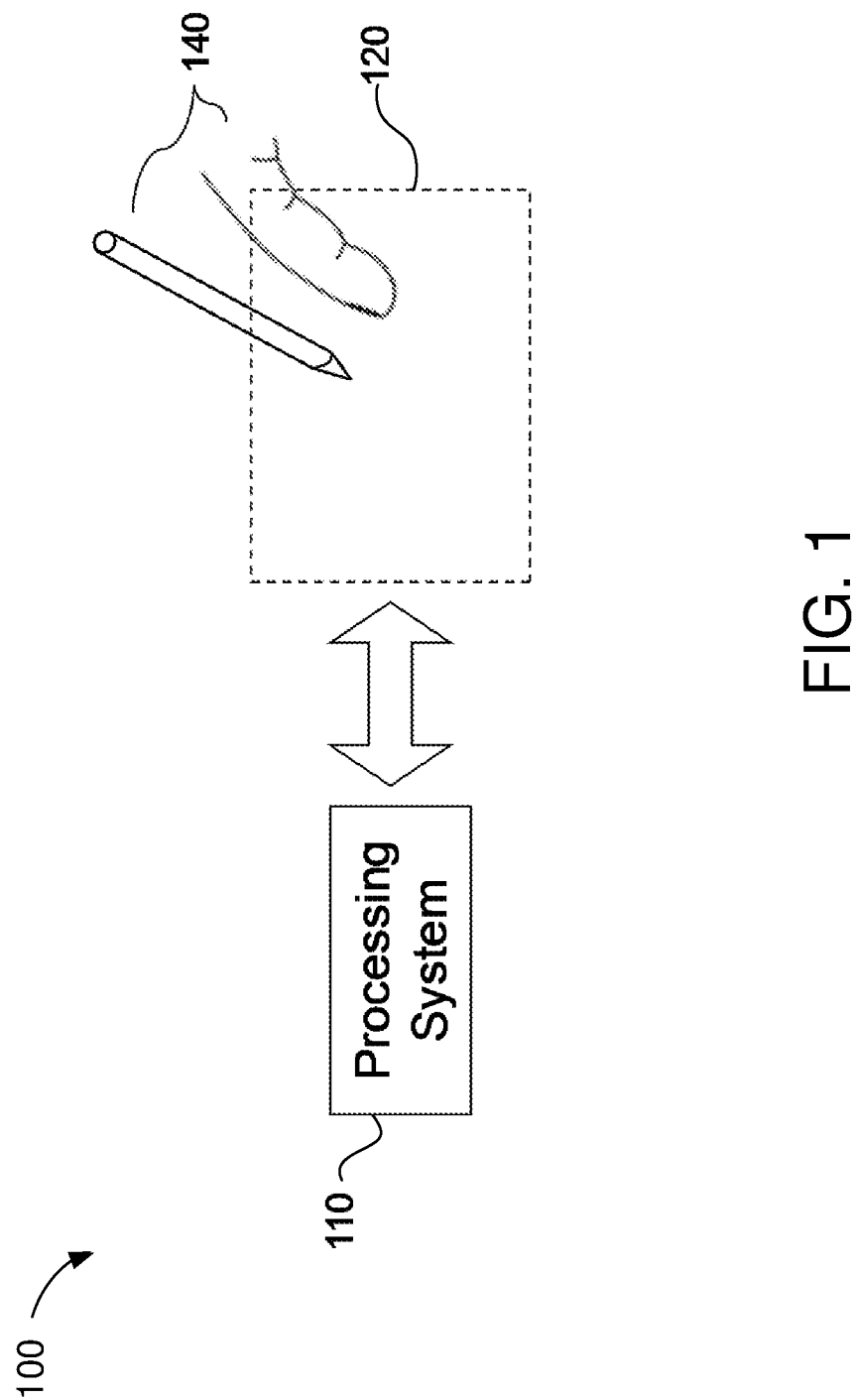
FIG. 1 shows an example input device within which the present embodiments may be implemented.

In the following description, numerous specific details are set forth such as examples of specific components, circuits, and processes to provide a thorough understanding of the present disclosure. The term "coupled" as used herein means connected directly to or connected through one or more intervening components or circuits. The terms "electronic system" and "electronic device" may be used interchangeably to refer to any system capable of electronically processing information. Also, in the following description and for purposes of explanation, specific nomenclature is set forth to provide a thorough understanding of the aspects of the disclosure. However, it will be apparent to one skilled in the art that these specific details may not be required to practice the example embodiments. In other instances, well-known circuits and devices are shown in block diagram form to avoid obscuring the present disclosure. Some portions of the detailed descriptions which follow are presented in terms of procedures, logic blocks, processing and other symbolic representations of operations on data bits within a computer memory.

These descriptions and representations are the means used by those skilled in the data processing arts to most effectively convey the substance of their work to others skilled in the art. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It should be borne in mind, however, that all of these and similar terms are to be associated with the appropriate physical quantities and are merely convenient labels applied to these quantities.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. Also, the example input devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors. The term "processor," as used herein may refer to any general purpose processor, conventional processor, controller, microcontroller, and/or state machine capable of executing scripts or instructions of one or more software programs stored in memory.

FIG. 1 shows an example input device 100 within which the present embodiments may be implemented. The input device 100 includes a processing system 110 and a sensing region 120. The input device 100 may be configured to provide input to an electronic system (not shown for simplicity). Examples of electronic systems may include personal computing devices (e.g., desktop computers, laptop computers, netbook computers, tablets, web browsers, e-book readers, and personal digital assistants (PDAs)), composite input devices (e.g., physical keyboards, joysticks, and key switches), data input devices (e.g., remote controls and mice), data output devices (e.g., display screens and printers), remote terminals, kiosks, video game machines (e.g., video game consoles, portable gaming devices, and the like), communication devices (e.g., cellular phones such as smart phones), and media devices (e.g., recorders, editors, and players such as televisions, set-top boxes, music players, digital photo frames, and digital cameras).

In some aspects, the input device 100 may be implemented as a physical part of the corresponding electronic system. Alternatively, the input device 100 may be physically separated from the electronic system. The input device 100 may be coupled to (and communicate with) components of the electronic system using various wired and/or wireless interconnection and communication technologies, such as buses and networks. Examples technologies may include Inter-Integrated Circuit (I$^2$C), Serial Peripheral Interface (SPI), PS/2, Universal Serial bus (USB), Bluetooth®, Infrared Data Association (IrDA), and various radio frequency (RF) communication protocols defined by the IEEE 802.11 standard.

In the example of FIG. 1, the input device 100 may correspond to a proximity sensor device (e.g., also referred to as a "touchpad" or "touch sensor device") configured to sense input provided by one or more input objects 140 in the sensing region 120. Example input objects 140 include fingers, styli, and the like. The sensing region 120 may encompass any space above, around, in, and/or proximate to the input device 100 in which the input device 100 is able to detect user input (such as provided by one or more input objects 140). The size, shape, and/or location of the sensing region 120 (e.g., relative to the electronic system) may vary depending on actual implementations.

In some embodiments, the sensing region 120 may extend from a surface of the input device 100 in one or more directions in space, for example, until a signal-to-noise ratio (SNR) of the sensors falls below a threshold suitable for object detection. For example, the distance to which the sensing region 120 extends in a particular direction may be on the order of less than a millimeter, millimeters, centimeters, or more, and may vary with the type of sensing technology used and/or accuracy desired. In some embodiments, the sensing region 120 may detect inputs involving no physical contact with any surfaces of the input device 100, contact with an input surface (e.g., a touch surface and/or screen) of the input device 100, contact with an input surface of the input device 100 coupled with some amount of applied force or pressure, and/or any combination thereof.

In some embodiments, input surfaces may be provided by, and/or projected on, one or more surfaces of a housing of the input device 100 (e.g., as an image). For example, the sensing region 120 may have a rectangular shape when projected onto an input surface of the input device 100. In some aspects, inputs may be provided through images spanning one, two, three, or higher dimensional spaces in the sensing region 120. In some other aspects, inputs may be provided through projections along particular axes or planes in the sensing region 120. Still further, in some aspects, inputs may be provided through a combination of images and projections in the sensing region 120.

The input device 100 may utilize various sensing technologies to detect user input. Example sensing technologies may include capacitive, elastive, resistive, inductive, magnetic, acoustic, ultrasonic, and optical sensing technologies. In some embodiments, the input device 100 may utilize capacitive sensing technologies to detect user inputs. For example, the sensing region 120 may include one or more capacitive sensing elements (e.g., sensor electrodes) to create an electric field. The input device 100 may detect inputs based on changes in capacitance of the sensor electrodes. For example, an object in contact with (or close proximity to) the electric field may cause changes in the voltage and/or current in the sensor electrodes. Such changes in voltage and/or current may be detected as "signals" indicative of user input. The sensor electrodes may be arranged in arrays or other configurations to detect inputs at multiple points within the sensing region 120. In some aspects, some sensor electrodes may be ohmically shorted together to form larger sensor electrodes. Some capacitive sensing technologies may utilize resistive sheets that provide a uniform layer of resistance.

Example capacitive sensing technologies may be based on "self-capacitance" (also referred to as "absolute capacitance") and/or "mutual capacitance" (also referred to as "transcapacitance"). Absolute capacitance sensing methods detect changes in the capacitive coupling between sensor electrodes and an input object. For example, an input object near the sensor electrodes may alter the electric field near the sensor electrodes, thus changing the measured capacitive coupling. In some embodiments, the input device 100 may implement absolute capacitance sensing by modulating sensor electrodes with respect to a reference voltage and detecting the capacitive coupling between the sensor electrodes and input objects. The reference voltage may be substantially constant or may vary. In some aspects, the reference voltage may correspond to a ground potential.

Transcapacitance sensing methods detect changes in the capacitive coupling between sensor electrodes. For example, an input object near the sensor electrodes may alter the electric field between the sensor electrodes, thus changing the measured capacitive coupling of the sensor electrodes. In some embodiments, the input device 100 may implement transcapacitance sensing by detecting the capacitive coupling between one or more "transmitter" sensor electrodes and one or more "receiver" sensor electrodes. Transmitter sensor electrodes may be modulated relative to the receiver sensor electrodes. For example, the transmitter sensor electrodes may be modulated relative to a reference voltage to transmit signals, while the receiver sensor electrodes may be held at a relatively constant voltage to "receive" the transmitted signals. The signals received by the receiver sensor electrodes may be affected by environmental interference (e.g., from other electromagnetic signals and/or objects in contact with, or in close proximity to, the sensor electrodes). In some aspects, each sensor electrode may either be a dedicated transmitter or a dedicated receiver. In other aspects, each sensor electrode may be configured to transmit and receive.

In some embodiments, the input device 100 may further detect a force exerted on an input surface coinciding with the sensing region 120. For example, the input device 100 may include one or more force sensors configured to generate force information representative of the force exerted by the input object 140 when making contact with the sensing region 120. In some aspects, the force information may be in the form of electrical signals representative of an amplitude (or change in amplitude) of the force applied to the input surface. For example, the force sensors may be formed, at least in part, by conductors provided on an underside of the input surface and a structure (such as a midframe) underlying the input surface. More specifically, the input surface may be configured to move (e.g., deflect and/or compress) relative to the underlying structure when a force is applied the input object 140. The force sensors may produce electrical signals based on a change in capacitance, between the conductors, when the input surface moves relative to the underlying structure.

The processing system 110 may be configured to operate the hardware of the input device 100 to detect input in the sensing region 120. In some embodiments, the processing system 110 may control one or more sensor electrodes and/or force sensors to detect objects in the sensing region 120. For example, the processing system 110 may be configured to transmit signals via one or more transmitter sensor electrodes and receive signals via one or more receiver sensor electrodes. The processing system 110 may also be configured to receive force information via one or more force sensors. In some aspects, one or more components of the processing system 110 may be co-located, for example, in close proximity to the sensing elements of the input device 100. In other aspects, one or more components of the processing system 110 may be physically separated from the sensing elements of the input device 100. For example, the input device 100 may be a peripheral coupled to a computing device, and the processing system 100 may be implemented as software executed by a central processing unit (CPU) of the computing device. In another example, the input device 100 may be physically integrated in a mobile device, and the processing system 110 may correspond, at least in part, to a CPU of the mobile device.

In some embodiments, the processing system 110 may be implemented as a set of modules that are implemented in firmware, software, or a combination thereof. Example modules include hardware operation modules for operating hardware such as sensor electrodes and display screens; data processing modules for processing data such as sensor signals and positional information; and reporting modules for reporting information. In some embodiments, the processing system 110 may include sensor operation modules configured to operate sensing elements to detect user input in the sensing region 120; identification modules configured to identify gestures such as mode changing gestures; and mode changing modules for changing operation modes of the input device 100 and/or electronic system.

The processing system 110 may respond to user input in the sensing region 120 by triggering one or more actions. Example actions include changing an operation mode of the input device 110 and/or graphical user interface (GUI) actions such as cursor movement, selection, menu navigation, and the like. In some embodiments, the processing system 110 may provide information about the detected input to the electronic system (e.g., to a CPU of the electronic system). The electronic system may then process information received from the processing system 110 to carry out additional actions (e.g., changing a mode of the electronic system and/or GUI actions).

The processing system 110 may operate the sensing elements of the input device 100 to produce electrical signals indicative of input (or lack of input) in the sensing region 120. The processing system 110 may perform any appropriate amount of processing on the electrical signals to translate or generate the information provided to the electronic system. For example, the processing system 110 may digitize analog signals received via the sensor electrodes and/or perform filtering or conditioning on the received signals. In some aspects, the processing system 110 may subtract or otherwise account for a "baseline" associated with the sensor electrodes. For example, the baseline may represent a state of the sensor electrodes when no user input is detected. Accordingly, the information provided by the processing system 110 to the electronic system may reflect a difference between the signals received from the sensor electrodes and a baseline associated with each sensor electrode.

In some embodiments, the processing system 110 may further determine positional information and/or force information for a detected input. The term "positional information," as used herein, refers to any information describing or otherwise indicating a position or location of the detected input (e.g., within the sensing region 120). Example positional information may include absolute position, relative position, velocity, acceleration, and/or other types of spatial information. Likewise, the term "force information," as used herein, refers to any information describing or otherwise indicating a force exerted by an input object in contact with a touch surface of the input device 100. For example, the force information may be provided as a vector or scalar quantity (e.g., indicating a direction and/or amplitude). As another example, the force information may include a time history component and/or describe whether the force exerted by the input object exceeds a threshold amount.

In some embodiments, the input device 100 may include a touch screen interface (e.g., display screen) that at least partially overlaps the sensing region 120. For example, the sensor electrodes of the input device 100 may form a substantially transparent overlay on the display screen, thereby providing a touch screen interface for the associated electronic system. The display screen may be any type of dynamic display capable of displaying a visual interface to a user. Examples of suitable display screen technologies may include light emitting diode (LED), organic LED (OLED), cathode ray tube (CRT), liquid crystal display (LCD), plasma, electroluminescence (EL), or other display technology.

In some embodiments, the input device 100 may share physical elements with the display screen. For example, one or more of the sensor electrodes may be used in displaying the interface and sensing inputs. More specifically, a sensor electrode used for sensing inputs may also operate as a display electrode used for displaying at least a portion of the interface. In some embodiments, the input device 100 may include a first sensor electrode configured for displaying at least part of the interface and sensing inputs, and a second sensor electrode may be configured for input sensing only. For example, the second sensor electrode may be disposed between substrates of the display device or may be external to the display device.

In some aspects, the display screen may be controlled or operated, at least in part, by the processing system 110. The processing system 110 may be configured to execute instructions related to sensing inputs and displaying the interface. For example, the processing system 110 may drive a display electrode to display at least a portion of the interface and sense user inputs, concurrently. In another example, the processing system 110 may drive a first display electrode to display at least a portion of the interface while concurrently driving a second display electrode to sense user inputs.

As described above, the processing system 110 may detect a force exerted by the input object 140 in the sensing region 120 (e.g., an "input force") based on changes in an electric field (or capacitance) provided by corresponding force sensors. More specifically, the processing system 110 may continuously (or periodically) detect the capacitance of a force sensor and compare the detected capacitance against a baseline capacitance level (e.g., corresponding to a state of the force sensor when no external force is exerted on the input surface). The processing system 110 may sense an input force if the capacitance detected across one or more force sensors differs from their respective baselines by a threshold amount. Therefore, the accuracy and/or likelihood with which the processing system 110 is able to detect an input force may depend, at least in part, on a flexibility of the input surface (specifically, the ability of the input surface to deflect or compress relative to a reference plane within the input device 100). For example, the processing system 110 may be more likely to detect input forces that are applied to more flexible materials (such as plastic) than to more rigid materials (such as glass).

In some embodiments, the input surface of the input device 100 may be formed from a relatively flexible or "deformable" material (e.g., plastic). More specifically, the flexibility of the material may enable forces exerted on the input surface to be transmitted to the underlying force sensors with relative ease (e.g., compared to input surface formed from more rigid materials, such as glass). However, it is also noted that the flexibility of the input surface may vary with respect to its surface area. For example, an input surface with a relatively small surface area may be harder to depress or deform (e.g., under external forces) than an input surface having a larger surface area (e.g., assuming both input surfaces are made from the same material, having the same uniform thickness).

Still further, in some embodiments, the input surface may wrap around one or more edges of the input device 100. For example, the input surface may be provided by a cover lens having a relatively flat front surface and curved edges. The curved input surface may allow the input device 100 to detect user inputs on the edges or sides of a corresponding device and/or display screen. The edges of a device are typically much narrower than the front surface. Accordingly, the edge regions of the curved input surface may have significantly less surface area than the frontal region. As noted above, the flexibility of an input surface may depend on its surface area. Thus, the frontal region of the input surface may be significantly more flexible than the edge regions. For example, the frontal region of the input surface may deform much more easily (e.g., in response to forces applied by the input object 140) than the edge regions.

Aspects of the present disclosure may provide a mechanism for transferring forces exerted on different regions of a deformable input surface to one or more force sensors below the deformable input surface, where the different regions of the deformable input surface have different levels of flexibility. As described in greater detail below, the force transfer mechanism may effectively alter the flexibility of the deformable input surface across each of the different regions. For example, the force transfer mechanism may allow for greater flexibility in the edge regions of the deformable input surface, while limiting the flexibility of the frontal region of the deformable input surface. Accordingly, the force transfer mechanism may ensure that the relative flexibility of each region of the deformable input surface is commensurate to its corresponding surface area.

Among other advantages, the embodiments described herein allow for force sensing in the frontal region and along the edges of an input surface. More specifically, the force transfer layer may allow external forces (e.g., exerted by the input object 140) to be distributed differently in the different regions of the deformable input surface. For example, when a force is exerted by the input object 140 in an edge region of the deformable input surface, the force transfer mechanism may transmit the force to a force sensor located within a relatively small or precise area beneath the input surface. On the other hand, when a force is exerted by the input object 140 in the frontal region of the deformable input surface, the force transfer mechanism may distribute the force to one or more force sensors located in a larger area beneath the input surface. Accordingly, the force transfer mechanism may ensure that at least one of the force sensors may detect a force exerted at any location on the input surface.

Figure 2:
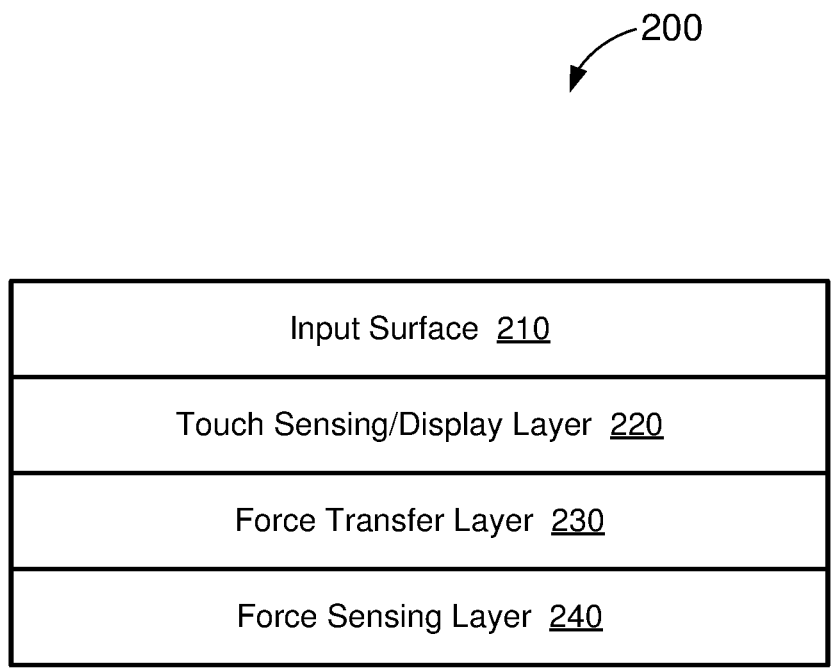
FIG. 2 shows a block diagram depicting a cross-section of an input device, in accordance with some embodiments.

FIG. 2 shows a block diagram depicting a cross-section of an input device 200, in accordance with some embodiments. The input device 200 may be an example embodiment of the input device 100 of FIG. 1. Specifically, the input device 200 includes an input surface 210, a touch sensing and display layer 220, a force transfer layer 230, and a force sensing layer 240.

Figure 5:
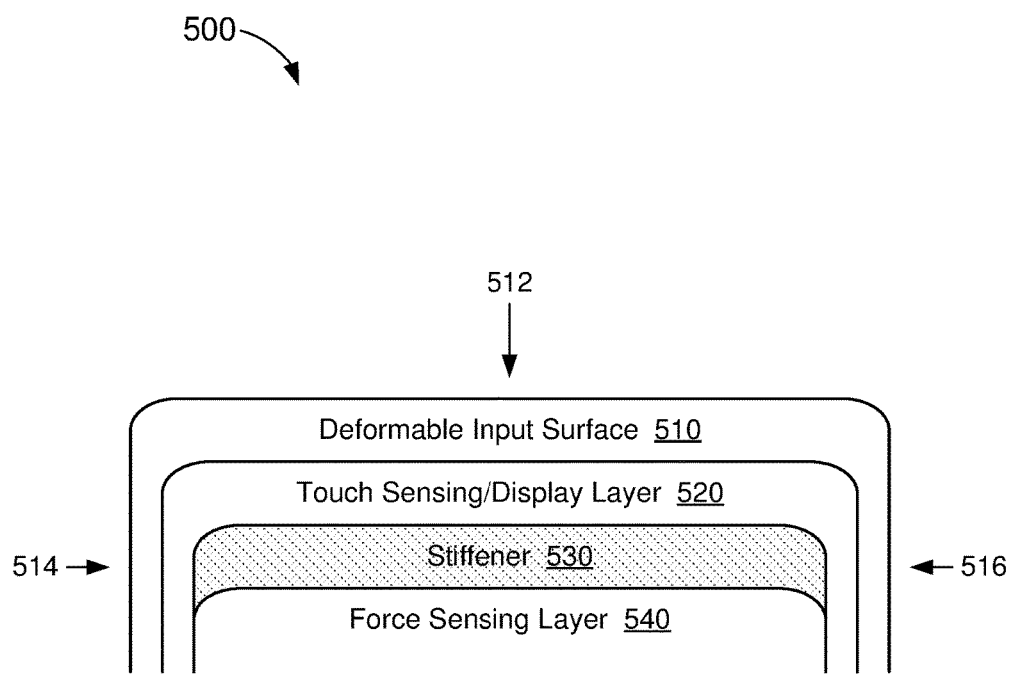
FIG. 5 shows a cross-sectional view of an input device with edge force sensing capabilities, in accordance with some embodiments.
Figure 7:
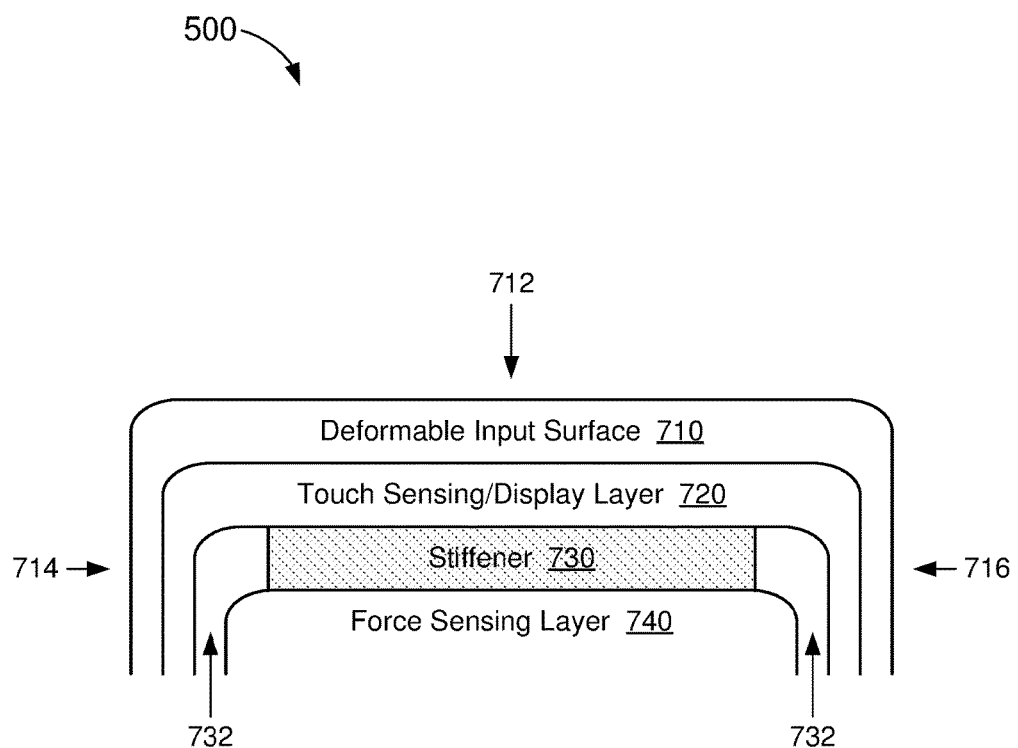
FIG. 7 shows a cross-sectional view of an input device with edge force sensing capabilities, in accordance with some other embodiments.

The input surface 210 provides a tactile surface for receiving user inputs (e.g., via an input object 140). For example, the input surface 210 may provide at least part of a sensing region for the input device (such as sensing region 120 of FIG. 1). The input surface 210 may also function as a cover lens for a display screen. For example, the input surface 210 may be formed from a clear or transparent material to facilitate the transmission of light from the touch sensing and display layer 220. In some embodiments, the input surface 210 may be formed from a flexible or deformable material (such as plastic) that is configured to deflect and/or compress when a threshold amount of force is applied (such as exerted by a finger press). Still further, in some embodiments, the input surface 210 may wrap (or curve) around one or more edges of the input device 200 (e.g., as shown in FIGS. 5 and 7).

The touch sensing and display layer 220 is configured to detect user inputs on the input surface 210 and/or provide a visual interface for the input device 200. In some aspects, the touch sensing and display layer 220 may include an array of sensor electrodes that create an electric field in and/or around the input surface 210. The input device 200 may detect user inputs based on changes in a capacitance of the sensor electrodes and/or the electric field. In some aspects, the touch sensing and display layer 220 may include an array of display pixels, where each row of display pixels is coupled to a gate driver and each column of display pixels is coupled to a source driver. The input device 200 may update the visual interface by successively "scanning" the rows of pixel elements (e.g., driving update data onto the pixel elements in each row, one row at a time). In some embodiments, at least some of the circuitry used for detecting user inputs may also be used for providing the visual interface. In other embodiments, the circuitry used for detecting user inputs may be separate from the circuitry used for providing the visual interface. Still further, in some embodiments, the circuitry used for detecting user inputs may be provided on a different layer of the input device than the circuitry used for providing the visual interface.

The force sensing layer 240 is configured to detect forces exerted on the input surface 210 (e.g., associated with user inputs). For example, the force sensing layer 240 may include a plurality of force sensors positioned beneath discrete regions of the input surface 210. Each of the force sensors may be formed, at least in part, by conductors provided on the force sensing layer 240 and a reference structure (not shown for simplicity). For example, the reference structure may be a relatively rigid structure (such as a device midframe) underlying the force sensing layer 240. Alternatively, and/or in addition, the reference structure may correspond to the underside of the touch sensing/display layer 220. The input device 200 may detect a force exerted on the input surface 210 based at least in part on changes in a capacitance of the conductors when the force sensing layer 240 deflects and/or compresses relative to the reference structure (or vice-versa).

The increased flexibility of the input surface 210 may also increase the precision with which external forces are transferred through the input surface 210 (e.g., more flexion may allow for steeper bend angles, and thus more localized force transfer). Moreover, different regions of the input surface 210 may have different sized surface areas. For example, the edges of the input surface 210 may have less surface area than the front of the input surface 210. Thus, the force sensing layer 240 should be able detect input forces over a larger surface area in response to user inputs provided on the front of the input surface 210 compared to the edges of the input surface 210. An example way of achieving this is to increase the density of force sensors coinciding with (or overlapping) the frontal region of the input surface. However, the present embodiments recognize that, due to technical constraints, it may not be feasible to increase the number of force sensors beyond a threshold density.

Furthermore, increasing the number of force sensors may not be a practical solution. For example, force sensing is typically used to provide an extra dimension to the user input detected by the capacitive sensors (e.g., in the touch sensing and display layer 220). Specifically, the capacitive sensors may detect the precise location or position of an input object in contact with the input surface 210, while the force sensors merely determine whether the force exerted on the input surface 210 exceeds a certain threshold (e.g., whether the input object is pressing down on the input surface 210 or simply touching the input surface 210). Thus, the manufacturing costs may significantly outweigh any benefits to the user when increasing the number of force sensors beyond a threshold density.

The force transfer layer 230 may facilitate the transfer of forces, exerted on different regions of the input surface 210, to one or more force sensors in the force sensing layer 240. More specifically, the force transfer layer 230 may enable the input device 200 to detect forces exerted anywhere in the input surface 210 without increasing the density of force sensors in the force sensing layer 240. In some embodiments, the force transfer layer 230 may allow for greater flexibility in the edge regions of the input surface 210, while limiting the flexibility of the frontal region of the input surface 210. As a result, forces exerted on the edges of the input surface 210 may be transmitted to the force sensing layer 240 with greater precision. For example, when a force is exerted by an input object on an edge region of the input surface 210, the force transfer layer 230 may transmit the force to a force sensor located within a relatively small area of the force sensing layer 240. On the other hand, forces exerted on the front of the input surface 210 may be diffused and/or dispersed across the force sensing layer 240. For example, when a force is exerted by an input object on the frontal region of the input surface 210, the force transfer layer 230 may distribute the force to one or more force sensors located within a larger area of the force sensing layer 240.

Figure 3:
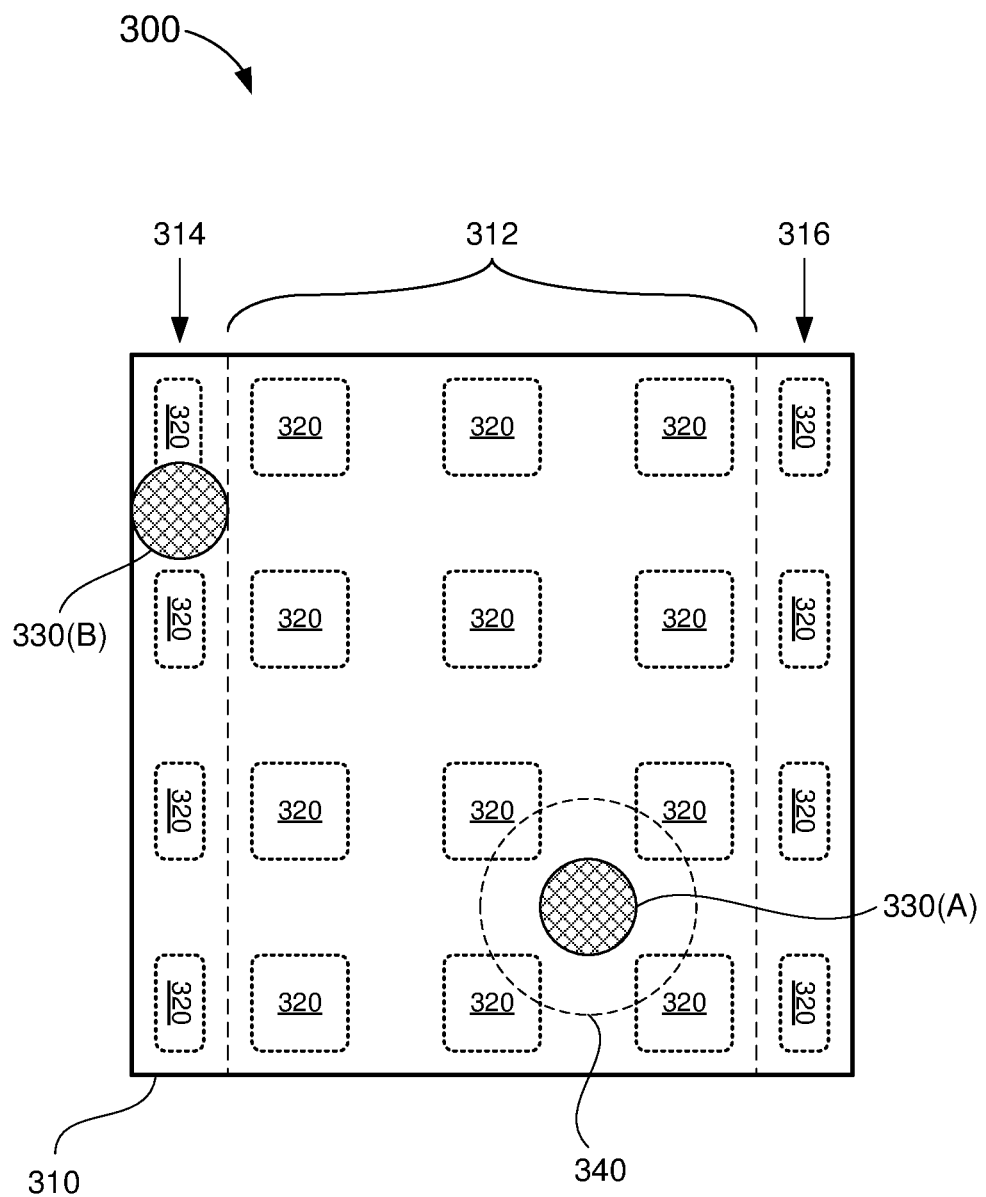
FIG. 3 shows an example sensor configuration underlying an input surface of an input device, in accordance with some embodiments.

FIG. 3 shows an example sensor configuration 300 underlying an input surface 310 of an input device, in accordance with some embodiments. The input device depicted in FIG. 3 may be an example embodiment of the input device 200 of FIG. 2. Thus, the input device may include additional circuitry (such as capacitive sensors and/or display pixels) not shown in FIG. 3, for simplicity.

The input surface 310 may be formed from a flexible or deformable material (such as plastic) that is configured to deflect and/or compress when a threshold amount of force is exerted. In the example of FIG. 3, the input surface 310 is subdivided into a frontal region 312 and two edge regions 314 and 316. As described above, the edge regions 314 and 316 may wrap around the sides and/or edges of the input device. The frontal region 312 is substantially flat. In some aspects, the edge regions 314 and 316 may be curved. In some embodiments, the input surface 310 may be formed from one continuous layer of material (e.g., having a uniform thickness).

The sensor configuration 300 shows a number of force sensors 320 disposed beneath the input surface 310. Although the force sensors 320 are depicted in a grid-like arrangement, in actual implementations the force sensors 320 may be arranged in various other patterns. Furthermore, each of the force sensors 320 coinciding with the frontal region 312 of the input surface 310 is shown to have substantially the same shape and size, whereas the force sensors 320 coinciding with the edge regions 314 and 316 of the input surface 310 are shown to have different shapes and sizes than those in the frontal region 312. However, in actual implementations, each of the force sensors 320 may be of various shapes and/or sizes. The number and/or density of force sensors in each of the regions 312-316 may also vary depending on actual implementations.

Each of the force sensors 320 may be configured to measure an amount of force exerted on a corresponding region of the input surface 310. In some aspects, each force sensor 320 may be formed from three layers of substrate. A first substrate layer may include a first electrode, a second substrate layer may include a second electrode, and a third substrate layer may be sandwiched between the first and second substrate layers to maintain a separation distance between the first electrode and the second electrode. For example, the third substrate layer may include an opening to expose at least a portion of the first electrode to the second electrode.

The first and second electrodes may form a variable capacitor. When a force is exerted on an input surface of the input device, the first substrate layer may deform and/or compress relative to the second substrate layer. This reduces the distance or gap between the first and second electrodes, which results in a change in capacitance across the electrodes. Specifically, the change in capacitance may be a function of the degree of movement of the first electrode relative to the second electrode. Thus, the change in capacitance may be directly correlated with the amount of force exerted on the input surface. A processing system (not shown for simplicity), coupled to the force sensors 320, may measure the change in capacitance of the first and second electrodes to determine a force exerted by an input object on the input surface 310.

In some instances, an input object may press on the input surface 310 at a particular location that does not coincide with any of the force sensors 320. For example, an input force 330(A) may be applied in between multiple force sensors coinciding with the frontal region 312 of the input surface 310. A relatively rigid input surface (e.g., made from glass) could distribute the input force 330(A) to one or more of the force sensors 320 in the frontal region 312, since the stiffness of the material would allow the input force 330(A) to be distributed over a larger area of the input surface 310. However, for the reasons given above, such a rigid input surface may also make it much more difficult (if not impossible) for the edge regions 314 and/or 316 to flex. Accordingly, the force sensors 320 coinciding with the edge region 314 (and 316) may be unable to detect an input force 330(B) exerted on a relatively rigid input surface.

Aspects of the present disclosure may enable force sensing in the edges 314 and 316 of the input surface 310 by forming the input surface 310 from a relatively flexible material (such as plastic). For example, a plastic cover lens may be significantly more flexible than a glass cover lens. Thus, forming the input surface 310 from plastic (e.g., instead of glass) enables a user to depress the edges 314 and/or 316 of the input surface 310 to actuate the force sensors 320 located below. For example, a force sensor 320 coinciding with the edge region 314 may detect the input force 330(B) exerted on a relatively flexible input surface. However, because the input surface 310 bends with relative ease, the force transferred by the input surface 310 may be highly localized. For example, the input surface 310 may transmit the input force 330(A) exerted on the frontal region 312 with very little spread. Thus, the input surface 310, by itself, may be unable to distribute the input force 330(A) to one or more of the force sensors 320.

In some embodiments, a force transfer layer of the input device (such as the force transfer layer 230) may transfer the forces exerted on the input surface 310 to one or more of the force sensors 320 below. More specifically, the force transfer layer may ensure that a force applied to any of the regions 312-316 of the input surface 310 may be detected by at least one of the force sensors 320. In some aspects, the force transfer layer may distribute the forces exerted in the frontal region 312 of the input surface 310 over a relatively large area of the underlying force sensing layer. Specifically, the force transfer layer may ensure that such forces are spread across an area large enough to actuate at least one of the force sensors 320 coinciding with the front region 312. For example, the force transfer layer may be configured to distribute the input force 330(A) over a relatively large area 340 of the underlying force sensing layer. In the example of FIG. 3, the area 340 overlaps four of the force sensors 320. Thus, any (and all) of these four force sensors 320 may detect the input force 330(A).

In some other aspects, the force transfer layer may transmit the forces exerted in the edge regions 314 and/or 316 of the input surface 310, with relatively little spread, to the underlying force sensing layer. Specifically, the force transfer layer may ensure that the edge regions 314 and/or 316 are sufficiently flexible to enable such forces to actuate at least one of the force sensors 320 coinciding with the edge regions 314 and/or 316. For example, the force transfer layer may be configured to distribute the input force 330(B) over a relatively small area (e.g., directly below the input surface 310) of the underlying force sensing layer. In the example of FIG. 3, the input force 330(B) is directly transmitted to one of the force sensors 320 in the edge region 314.

Figure 4:
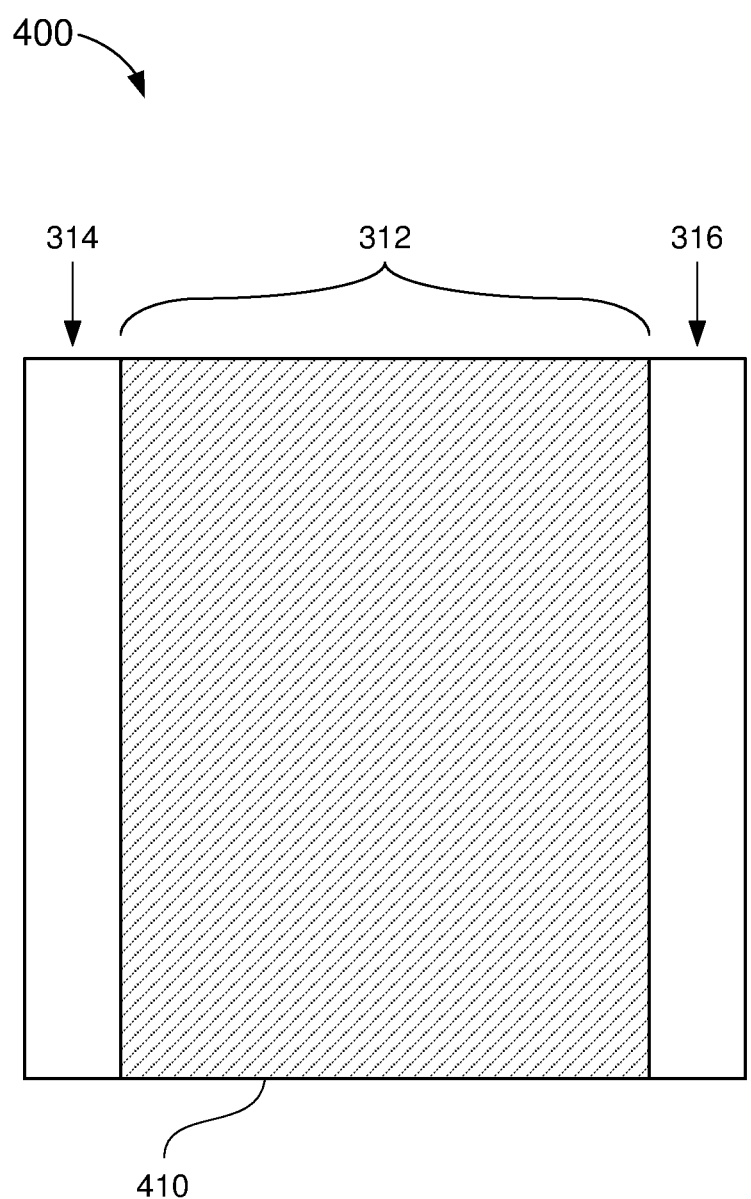
FIG. 4 shows a top view of an example force transfer layer, in accordance with some embodiments.

FIG. 4 shows a top view of an example force transfer layer 400, in accordance with some embodiments. The force transfer layer 400 may be an example embodiment of a force transfer layer for the input device depicted in FIG. 3. In some embodiments, the force transfer layer 400 includes a stiffener 410 that substantially overlaps the frontal region 312 of the input surface 310. The stiffener 410 may be formed from a relatively rigid material (such as stainless steel, FR4, or any other non-conductive material). The stiffener 410 reduces the flexibility of the frontal region 312 of the input surface 310. In some aspects, the frontal region 312, when combined with the stiffener 410, may deflect (e.g., under external forces) in a manner similar to glass. Thus, forces exerted in the frontal region 312 of the input surface 310 may be dispersed across a surface area of the stiffener 410 and redistributed to one or more of the force sensors 320 below. For example, the stiffener 410 may distribute the input force 330(A) over the area 340 coinciding with four force sensors 320.

In some embodiments, the stiffener 410 does not overlap the edge regions 314 and/or 316 of the input surface 310. For example, the absence of stiffener material allows the input surface 310 to remain relatively flexible in the edge regions 314 and/or 316. Thus, forces exerted in the edge regions 314 and/or 316 of the input surface 310 may be transmitted directly to one or more of the force sensors below 320 (e.g., with relatively little spread). Accordingly, the force transfer layer 400 may enable the input device to detect forces exerted in the edge regions 314 and/or 316 without compromising the ability of the input device to detect forces exerted in the frontal region 312 (or increasing the number and/or density of force sensors 320 in the frontal region 312). In other words, the force transfer layer 400 may enable force sensing in the edge regions 314 and/or 316 of the input surface 310 without substantially increasing the cost of the input device.

FIG. 5 shows a cross-sectional view of an input device 500 with edge force sensing capabilities, in accordance with some embodiments. The input device 500 includes a deformable input surface 510, a touch sensing and display layer 520, a stiffener 530, and a force sensing layer 540. The input device 500 may be an example embodiment of the input device 200 of FIG. 2 and/or the input device depicted in FIG. 3. For example, the deformable input surface 510 may correspond to and/or perform substantially the same functions as the input surface 210 and/or input surface 310. The deformable input surface 510 includes a frontal region 512 and edge regions 514 and 516. The various regions 512-516 of the deformable input surface 510 may correspond to respective regions 312-316 of the input surface 310.

The touch sensing and display layer 520 may correspond to and/or perform substantially the same functions as the touch sensing and display layer 220. Similarly, the force sensing layer 540 may correspond to and/or perform substantially the same functions as the force sensing layer 240. It is noted that the touch sensing and display layer 520 and the force sensing layer 540 also wrap around the edges of the input device 500. For example, the touch sensing and display layer 520 may detect user inputs and provide at least a portion of a visual interface in each of the edge regions 514 and 516 (in addition to the frontal region 512) of the input surface 510. Furthermore, the force sensing layer 540 may detect a force of the user inputs provided on each of the edge regions 514 and 516 (in addition to the frontal region 512) of the input surface 510.

In the example of FIG. 5, the stiffener 530 overlaps only the frontal region 512 of the input surface 510, and does not extend to the edge regions 514 and/or 516. Thus, the stiffener 530 may correspond to an embodiment of the force transfer layer 400 of FIG. 4 (specifically, the stiffener 410). The stiffener 530 may reduce the flexibility of the frontal region 512. For example, the stiffener 530 may be formed from a relatively rigid material (such as stainless steel, FR4, or any other non-conductive material). In some embodiments, the stiffener 530 may be configured to distribute forces exerted on the frontal region 512 over a relatively large surface area of the force sensing layer 540. The absence of stiffener material on the edge regions 514 and 516 may allow forces exerted on the edge regions 514 and/or 516 to be transmitted directly to the force sensing layer 540.

Figure 6:
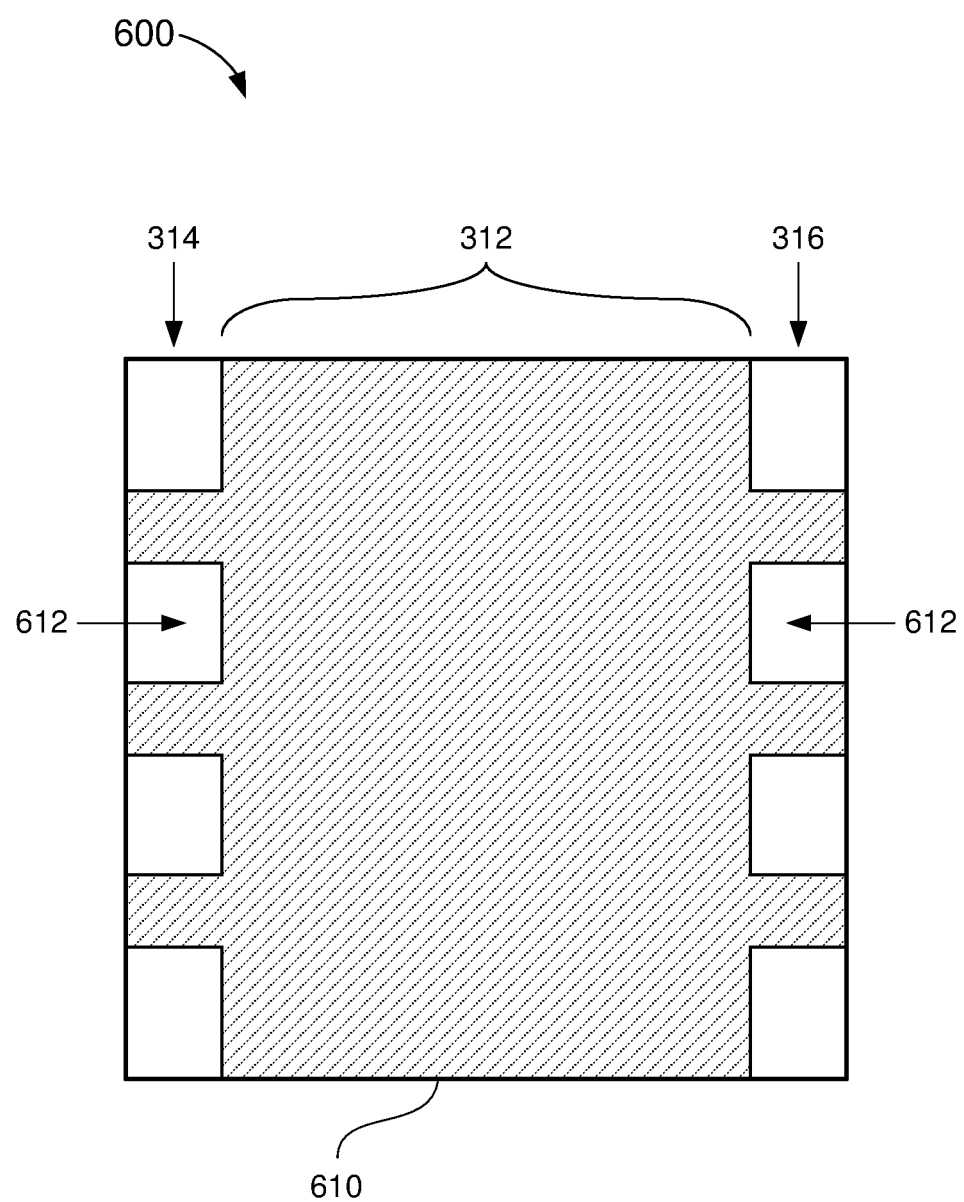
FIG. 6 shows a top view of an example force transfer layer, in accordance with some other embodiments.

FIG. 6 shows a top view of an example force transfer layer 600, in accordance with some other embodiments. The force transfer layer 600 may be an example embodiment of a force transfer layer for the input device depicted in FIG. 3. In some embodiments, the force transfer layer 600 includes a stiffener 610 that substantially overlaps the frontal region 312 of the input surface 310. The stiffener 610 may be formed from a relatively rigid material (such as stainless steel, FR4, or any other non-conductive material). The stiffener 610 reduces the flexibility of the frontal region 312 of the input surface 310. In some aspects, the frontal region 312, when combined with the stiffener 610, may deflect (e.g., under external forces) in a manner similar to glass. Thus, forces exerted on the frontal region 312 of the input surface 310 may be dispersed across a surface area of the stiffener 610 and redistributed to one or more of the force sensors 320 below. For example, the stiffener 610 may distribute the input force 330(A) over the area 340 coinciding with four force sensors 320.

In some embodiments, the stiffener 610 partially overlaps the edge regions 314 and/or 316 of the input surface 310. More specifically, the stiffener 610 may include cut-outs 612 that coincide with one or more force sensors 320 in the force sensing layer. For example, the cut-outs 612 allow the input surface 310 to remain relatively flexible where the force sensors 320 are located, while the stiffener 610 enhances the structural integrity of the edge regions 314 and 316. Thus, forces exerted in the edge regions 314 and/or 316, where the force sensors 320 are located, may be transmitted directly to the force sensors 320 below. Accordingly, the force transfer layer 600 may enable the input device to detect forces exerted in the edge regions 314 and/or 316 without compromising the ability of the input device to detect forces exerted in the frontal region 312 (and without increasing the number and/or density of force sensors 320 in the frontal region 312).

FIG. 7 shows a cross-sectional view of an input device 700 with edge force sensing capabilities, in accordance with some other embodiments. The input device 700 includes a deformable input surface 710, a touch sensing and display layer 720, a stiffener 730, and a force sensing layer 740. The input device 700 may be an example embodiment of the input device 200 of FIG. 2 and/or the input device depicted in FIG. 3. For example, the deformable input surface 710 may correspond to and/or perform substantially the same functions as the input surface 210 and/or input surface 310. The deformable input surface 710 includes a frontal region 712 and edge regions 714 and 716. The various regions 712-716 of the deformable input surface 710 may correspond to respective regions 312-316 of the input surface 310.

The touch sensing and display layer 720 may correspond to and/or perform substantially the same functions as the touch sensing and display layer 220. Similarly, the force sensing layer 740 may correspond to and/or perform substantially the same functions as the force sensing layer 240. It is noted that the touch sensing and display layer 720 and the force sensing layer 740 also wrap around the edges of the input device 700. For example, the touch sensing and display layer 720 may detect user inputs and provide at least a portion of a visual interface in each of the edge regions 714 and 716 (in addition to the frontal region 712) of the input surface 710. Furthermore, the force sensing layer 740 may detect a force of the user inputs provided on each of the edge regions 714 and 716 (in addition to the frontal region 712) of the input surface 710.

In the example of FIG. 7, the stiffener 730 overlaps the frontal region 712 of the input surface 710, and partially extends to the edge regions 714 and/or 716. More specifically, the stiffener 730 may include one or more cut-outs 732 in the portions that overlap the edge regions 714 and/or 716. For example, the cut-outs 732 may coincide with one or more force sensor locations in the force sensing layer 740. Thus, the stiffener 730 may correspond to an embodiment of the force transfer layer 600 of FIG. 6 (specifically, the stiffener 610). The stiffener 730 may reduce the flexibility of the frontal region 712. For example, the stiffener 730 may be formed from a relatively rigid material (such as stainless steel, FR4, or any other non-conductive material). In some embodiments, the stiffener 730 may be configured to distribute forces exerted on the frontal region 712 over a relatively large surface area of the force sensing layer 740. The air gaps formed by the cut-outs 732 on the edge regions 714 and 716 may allow forces exerted on the edge regions 714 and/or 716 to be transmitted directly to the force sensing layer 740.

In some embodiments, a conductive material (such as silver ink) may be deposited into one or more of the cut-outs 732. For example, where the force sensing layer 740 is disposed above the midframe of a device, the conductive material deposited in the cut-outs 732 may create an electrical ground electrode.

The ability to detect forces exerted on the edges of an input device may substantially enhance the user experience of the input device. In addition to being used to provide standalone user input (e.g., as a side button), the force sensors provided on the edge of the input device (e.g., "edge force sensors") may add an additional dimension to the input features of existing input devices. For example, a user may press on the edges of the input device, while concurrently pressing on the front surface of the input device, to trigger new input commands and/or features (such as a "force swipe" from the edge of the input device to the front surface of the input device). In some aspects, the edge force sensors may be used to determine whether a user is holding the input device (or mobile device) with a left hand or a right hand. For example, the edge force sensors may determine which side of the input device is being gripped by the user's fingers. In some other aspects, the edge force sensors may be used, in conjunction with one or more capacitive sensors, to toggle between various input commands. For example, the user may swipe the edge of the input device to toggle between available inputs, and may select a particular input by pressing down on the edge of the input device. These and other applications of the present embodiments may be apparent to one of ordinary skill in the art.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

In the foregoing specification, embodiments have been described with reference to specific examples thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. An input device comprising:
 a deformable input surface;

a force sensing layer disposed beneath the deformable input surface, the force sensing layer including a plurality of force sensors configured to detect forces exerted by an input object on the deformable input surface; and a force transfer layer disposed between the deformable input surface and the force sensing layer, the force transfer layer configured to provide different levels of flexibility to different regions of the deformable input surface by:

transmitting a force exerted by the input object in a first region of the deformable input surface to one or more of the force sensors coinciding with a first area of the force sensing layer; and distributing a force exerted by the input object in a second region of the deformable input surface to one or more of the force sensors coinciding with a second area of the force sensing layer, wherein the second area of the force sensing layer is larger than the first area, wherein the force transfer layer at least partially overlaps the first region of the deformable input surface and includes one or more cut-outs coinciding with the one or more force sensors in the first area of the force sensing layer.

2. The input device of claim 1, wherein the force transfer layer comprises a stiffener overlapping the second region of the deformable input surface and the second area of the force sensing layer.

3. The input device of claim 2, wherein the stiffener is configured to transfer the force exerted in the second region of the deformable input surface to the one or more force sensors in the second area of the force sensing layer.

4. The input device of claim 1, wherein each of the cut-outs is configured to enable a force exerted by the input object in the first region of the deformable input surface to be transmitted to one of the force sensors in the first area of the force sensing layer.

5. The input device of claim 2, wherein the stiffener at least partially overlaps the first region of the deformable input surface but does not overlap the one or more force sensors in the first area of the force sensing layer.

6. The input device of claim 1, wherein the force transfer layer is configured to distribute the force exerted in the second region of the deformable input surface to two or more of the force sensors.

7. The input device of claim 1, wherein the second region of the deformable input surface is flat and the first region of the deformable input surface is curved.

8. The input device of claim 1, wherein the second region of the deformable input surface corresponds to a front surface of a display and the first region of the deformable input surface corresponds to an edge of the display.

9. The input device of claim 1, wherein a thickness of the deformable input surface relative to a surface area of the second region is greater than the thickness of the deformable input surface relative to a surface area of the first region.

10. The input device of claim 1, wherein the deformable input surface comprises a plastic cover lens.

11. An input device comprising:
a deformable input surface;
a force sensing layer disposed beneath the deformable input surface, the force sensing layer including:
one or more first force sensors configured to detect forces exerted by an input object in a first region of the deformable input surface; and
a plurality of second force sensors configured to detect forces exerted by the input object in a second region of the deformable input surface; and
a stiffener overlapping the plurality of second force sensors and configured to provide different levels of flexibility to different regions of the deformable input surface by transferring a force exerted by the input object in the second region of the deformable input surface to one or more of the second force sensors, wherein the stiffener at least partially overlaps the first region of the deformable input surface and includes one or more cut-outs coinciding with the one or more first force sensors.

12. The input device of claim 11, wherein the force exerted in the second region of the deformable input surface is distributed across a surface of the stiffener.

13. The input device of claim 11, wherein the stiffener is configured to distribute the force exerted in the second region of the deformable input surface to two or more of the second force sensors.

14. The input device of claim 11, wherein a thickness of the deformable input surface relative to a surface area of the second region is greater than the thickness of the deformable input surface relative to a surface area of the first region.

15. The input device of claim 11, wherein each of the cut-outs is configured to enable a force exerted by the input object in the first region of the deformable input surface to be transmitted to one of the first force sensors.

16. The input device of claim 11, wherein the second region of the deformable input surface is flat and the first region of the deformable input surface is curved.

17. The input device of claim 11, wherein the second region of the deformable input surface corresponds to a front surface of a display and the first region of the deformable input surface corresponds to an edge of the display.

18. The input device of claim 11, wherein a thickness of the deformable input surface relative to a width of the second region is greater than the thickness of the deformable input surface relative to a width of the first region.

19. The input device of claim 11, wherein the deformable input surface comprises a plastic cover lens.

* * * * *